INVENTOR.
ALVIN W. PISCHKE

Oct. 6, 1959 A. W. PISCHKE 2,907,225
WORM-GEAR DRIVE ASSEMBLY
Filed Aug. 16, 1957 2 Sheets-Sheet 2
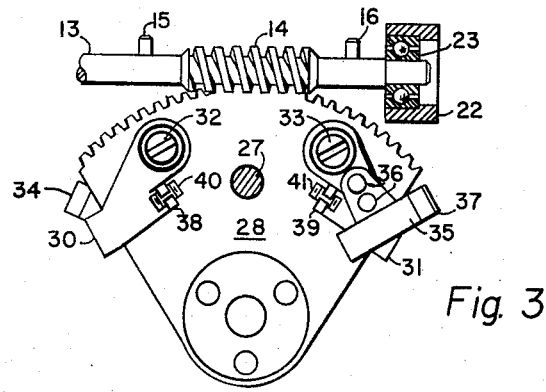
Fig. 3
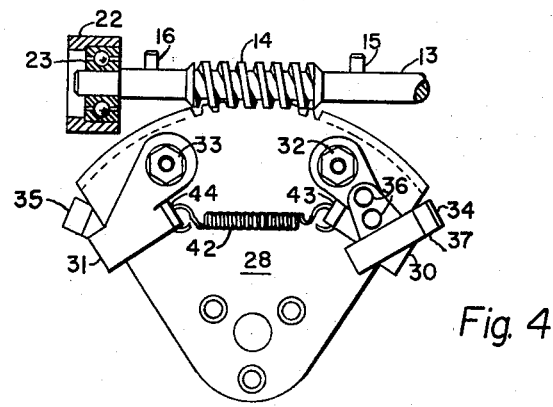
Fig. 4
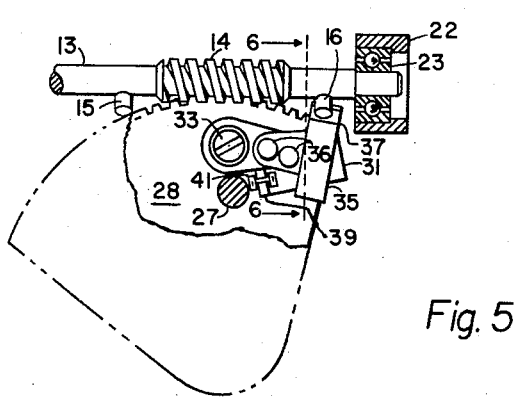
Fig. 5
Fig. 6
INVENTOR.
ALVIN W. PISCHKE
BY
Roger W. Jensen
ATTORNEY

United States Patent Office 2,907,225
Patented Oct. 6, 1959

2,907,225

WORM-GEAR DRIVE STOP ASSEMBLY

Alvin W. Pischke, Los Angeles, Calif., assignor to Minneapolis-Honeywell Regulator Company, Minneapolis, Minn., a corporation of Delaware Application August 16, 1957, Serial No. 678,654

9 Claims. (Cl. 74—425)

My invention relates to an improvement in stop mechanisms for a non-reversible type worm and worm gear transmission.

In previous worm gear drive assemblies, a mechanical limit stop was usually positioned so as to engage a sector gear, or the worm gear, to stop its rotation. Generally such a device was driven by a motor which had a friction or slip clutch in its gear train and when the worm gear engaged the mechanical stop, the worm and worm gear were prevented from rotating, but the motor usually continued to apply torque to the shaft through the slip clutch or friction clutch. Since there is a certain amount of kinetic energy associated with the rotating worm and worm gear, as the sector gear or worm gear is engaged by the mechanical limit, the kinetic energy of the worm causes the worm gear to be driven into the stop with an axial force sufficient to cause the worm and worm gear to be jammed. This axial force with respect to the worm, acts on the coacting areas between the worm and worm gear. Thus the worm is wedged against the sector or worm gear and if the motor is reversed to drive the gear train out of its limit, a greater amount of torque is required to drive the worm and worm gear away from the limit than is required to drive the worm and worm gear into the limit. Generally, when this happens the motor merely drives the friction clutch and the gear train remains jammed in the limit.

Another prior form of worm gear drive assembly used a mechanical stop to limit the amount of rotation of the worm gear and was not driven through a slip clutch but was driven directly and allowed the motor to be operated with stall torque applied while the worm gear was engaged by the stop. This drive assembly had the same inherent limitations as the one using the slip clutch, i.e., the gear train remained jammed in the limit stop.

My invention is directed toward an improvement in such a worm and worm gear limiting device in that the amount of torque required to reverse the gear train will not be more than that required to drive the gear train into its mechanical limit. The later mentioned feature of my invention is accomplished by using a tangential force rather than an axial force with respect to the worm, to stop the rotation of the worm and worm gear. Another aspect of my invention lies in the use of certain resilient materials to aid further in restraining the driving torque which drives a gear train into its mechanical limit.

It is therefore a general object of this invention to provide an improved stop means for a worm and worm gear drive apparatus.

It is another object of this invention to improve worm-gear stop limits by using a tangential force with respect to the worm rather than an axial force for arresting rotation of the worm.

It is another object of this invention to provide a resilient stop means for reducing the torque required to drive the worm in a reverse direction.

It is a further object of this invention to provide a stop means which is engaged after the worm gear has rotated through a predetermined angle.

These and other features of the invention will be understood more clearly and fully from the following detailed description and accompanying drawings in which:

Figure 3 is a front view of the worm and worm gear shown in detail;

Figure 4 is a back view of the worm and sector gear showing a spring restraining means;

Figure 5 is a front view of the worm and worm gear showing the stop assemblies engaged; and Figure 6 is a cross section of the stop assembly as viewed from section lines 6—6.

Figure 1:
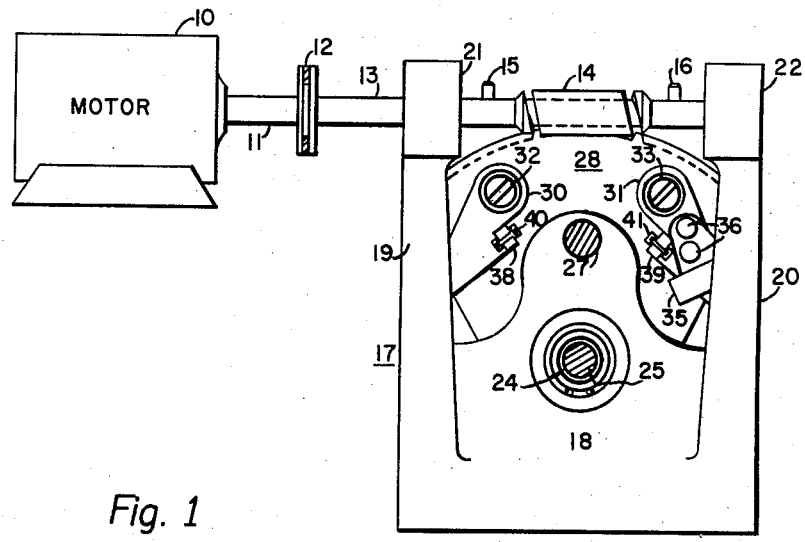
Figure 1 is a front view showing a worm and worm gear engaged midway between the stops.

The figures show a motor 10 which has a shaft 11 that is used to rotate a friction clutch 12 and thereby rotate a shaft 13. Shaft 13 has attached to it, a worm 14 and a pair of protruding arresting lugs 15 and 16. A housing 17 consisting of a base portion 18 and a pair of upwardly extending arm members 19 and 20 integral with base portion 18, has a pair of bearing bores 21 and 22 located at the extremities of arm members 19 and 20. A pair of bearings of which only 23 is visible are supported in bearing bores 21 and 22, to journal shaft 13. Housing 17 also supports a pair of bearings of which only 24 is visible, to journal a shaft 25. Shaft 25 is perpendicular to shaft 13 and has a flange portion 26 integral with the shaft and parallel to shaft 13. Situated above shaft 25 is a stop pin 27 which protrudes from housing 17 towards a sector gear or worm gear 28. Sector gear 28 is attached to flange 26 of shaft 25 by suitable means such as screws 29. Attached to worm gear 28 are a pair of levers 30 and 31 which are formed in a U shape and pivotally supported about an axis parallel to shaft 25 by a pair of screws or suitable fasten means 32 and 33. Levers 30 and 31 straddle sector gear 28 and are free to rotate beyond the addendum circle without striking the gear teeth of gear 28. A pair of U-shaped leaf springs 34 and 35 are fastened to levers 30 and 31 respectively. Leaf springs 34 and 35 are fastened by suitable means such as rivets 36 and include a curved end portion 37 which is adapted to be engaged by lugs 15 or 16 as will be described later. Springs 34 and 35 are fastened to opposite sides of levers 30 and 31 to affect the proper operation of the arresting means for both directions of rotation of worm 14. A portion 38 and a portion 39 of levers 30 and 31 respectively are bent at right angles to the plane of the levers and threaded to receive a pair of adjusting screws 40 and 41 respectively.

Figure 2:
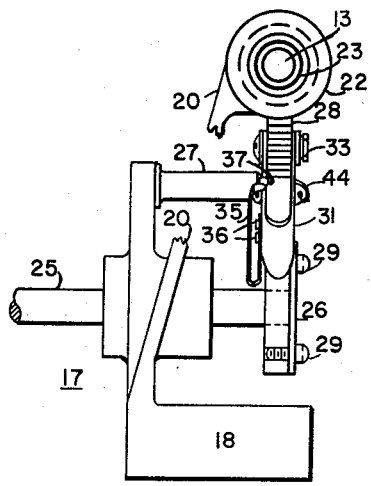
Figure 2 is a side view showing the stop assembly and resilient arresting means.

Figures 3, 4, 5, and 6 are detailed drawings of the worm 14 and worm gear 28 as shown in Figures 1 and 2. Figure 4 also shows a tension spring 42 which is connected to levers 30 and 31 at upturned portions 43 and 44 to restrain their rotation.

Assuming the worm 14 and worm gear 28 are in the position shown in Figure 3, if motor 10 drives shaft 13 through friction clutch 12, shaft 13 is rotated clockwise as viewed in Figure 2, and worm gear 28 will be rotated counterclockwise as viewed in Figures 1, 3, and 5. As shaft 13 rotates, sector gear 28 approaches the point where mechanical stop 27 will engage adjustable screw 41 which is a part of lever 31. It may be noted that normally lever 31 which has attached thereto leaf spring 35, is held in a position by spring 42 so that lug 16 will not engage curved portion 37 of leaf spring 35. However, after lever 31 in engaged with stop 27 and sector gear 28 continues to rotate counterclockwise, curved portion 37 of leaf spring 35 is projected into the path of rotation defined by lug 16 such that lug 16 is engaged by leaf spring 35. This is shown in more detail in Figure 6 which shows lug 16 being engaged by the curved portion 37 of leaf spring 35. Therefore, as shaft 13 attempts to rotate further it is restrained by the resilient spring 35 and tends to lessen the shock created by the engagement of lug 16 and leaf spring 35. Leaf springs 35 and 34 are formed in the U shape to provide a greater lever in restraining the rotation of lugs 16 and 15 respectively. In the previous methods of limiting the rotation of worm gear 28, the mechanical stop was usually placed at the limit of the predetermined angle through which the worm gear 28 was to rotate and the worm 14 merely drove the sector gear 28 into the limit and then the motor continued driving through friction clutch 12. In that arrangement, the general result is that worm 14 and worm gear 26 become wedged and immovable such that they remain jammed in the limit and a greater torque is required to reverse the direction of rotation of worm 14. In my invention it will be noted that worm gear 28 is not driven into a mechanical stop and thereby worm gear 28 remains relatively free from jamming since the only force used in arresting the rotation of worm 14 is a force tangent to the direction of rotation of worm 14 and not an axial force which would tend to drive worm 14 into the gear teeth of worm gear 28. Having thus alleviated the problem of gear jamming by eliminating the axial force applied to stop the rotation of worm 14, upon reversing the direction of rotation of shaft 13 the driving torque of the motor is sufficient to reverse the direction of worm 14 and drive it out of the limit.

It will be noted that when worm 14 is rotating clockwise, as shown in Figure 1, lever 31 is contacted by stop 27 causing leaf spring 35 to be engaged by lug 16 and when worm 14 is driven counterclockwise, as shown in Figure 1, lever 30 is contacted by stop 27 causing leaf spring 34 to be engaged by lug 15. The design angle of rotation for sector gear 28 is determined by the location of screws 32 and 33, since levers 30 and 31 are pivoted respectively about screws 32 and 33 to cause springs 34 and 35 to engage lugs 15 and 16. Adjusting screws 40 and 41 act as a vernier adjustment to ensure a proper engagement of lugs 15 and 16 with the curved end portions 37 of springs 34 and 35.

In considering this invention it should be remembered that the preceding disclosure is for illustration only and the scope of the invention should be based solely on the following claims.

What I claim is:

1. A gear train stop assembly comprising: a first gear pivotally supported for rotation; first arresting means rotating unitarily with said first gear to define a rotational path; a second gear pivotally supported for rotation while operatively engaging said first gear; a lever pivotally attached to said second gear; second arresting means attached to said lever and adapted to be displaced into said rotational path of said first arresting means upon rotation of said lever; and stop means adapted to be engaged by said lever upon rotation of said second gear causing said lever to rotate said second arresting means into said rotational path of said first arresting means for preventing rotation of said first and second gears.

2. A gear train stop assembly comprising: first gear means pivotally supported for rotation; projecting means rotating unitarily with said first gear means to define a path of rotation; second gear means pivotally supported for rotation while operatively engaging said first gear means; resilient arresting means pivotally connected to said second gear means and adapted to be displaced into said path of rotation of said projecting means upon rotation of said resilient arresting means; and engaging means adapted to be engaged by said resilient arresting means upon rotation of said second gear means causing said resilient arresting means to rotate into said path of rotation defined by said projecting means causing said first and second gear means to cease rotation.

3. A gear train stop assembly comprising: a housing; a first gear pivotally supported for rotation by said housing; first arresting means rotating unitarily with said first gear to define a rotational path; a second gear pivotally supported for rotation by said housing while operatively engaging said first gear; a lever pivotally attached to said second gear; second arresting means attached to said lever and adapted to be displaced into said rotational path of said first stop means upon rotation of said lever; and stop means supported by said housing and adapted to be engaged by said lever upon rotation of said second gear causing said lever to rotate said second means into said rotational path of said first arresting means for preventing rotation of said first and second gears.

4. A gear train stop assembly comprising: first gear means supported for rotation about its rotational axis; lug means rotating unitarily with said first gear means to define a path of rotation; second gear means supported for rotation about an axis of rotation for operatively engaging said first gear means; first and second levers pivotally attached to said second gear means; first spring means attached to said levers and adapted to be displaced into said path of rotation of said lug means upon rotation of said levers; second spring means connected to said levers for opposing rotations of said levers; and stop means adapted to be selectively engaged by said levers upon rotation of said second gear means so that said levers pivotally displace said first spring means into said path of rotation of said lug means for preventing rotation of said first and second gear means.

5. A gear train stop assembly comprising: a worm pivotally supported about its rotational axis; lug means rotating unitarily with said worm to define a path of rotation; a worm gear pivotally supported about an axis of rotation for operatively engaging said worm; lever means pivotally attached to said worm gear; first spring means attached to said lever means and adapted to be displaced into said path of rotation of said lug means upon rotation of said lever means; second spring means connected to said lever means; and stop means adapted to be engaged by said lever means upon rotation of said worm gear so that said lever means pivotally displace said first spring means into said path of rotation of said lug means for preventing rotation of said worm and worm gear.

6. A gear train stop assembly comprising: a worm supported for rotation about its rotational axis; a plurality of lugs rotating unitarily with said worm to define paths of rotation; a worm gear supported for rotation about an axis of rotation for operatively engaging said worm; a plurality of levers pivotally attached to said worm gear; leaf-spring means attached to said levers and adapted to be displaced into said paths of rotation of said lugs upon rotation of said levers; spring means connected to said levers for opposing rotations of said levers; and stop means adapted to be selectively engaged by said levers upon rotation of said worm gear so that said levers pivotally displace said leaf-spring means into said paths of rotation of said lugs for preventing rotation of said worm and worm gear.

7. A gear train stop assembly comprising: a worm pivotally supported about its rotational axis; a plurality of lugs rotating unitarily with said worm to define paths of rotation; a worm gear pivotally supported about an axis of rotation for operatively engaging said worm; first and second levers pivotally attached to said worm gear;

leaf-spring means attached to said levers and adapted to be displaced into said paths of rotation of said lugs upon rotation of said levers; spring means connected to said levers for opposing rotations of said levers; and a stud adapted to be selectively engaged by said levers upon rotation of said worm gear so that said levers pivotally displace said leaf-spring means into said paths of rotation of said lugs for preventing rotation of said worm and worm gear.

8. A gear train stop assembly comprising: a first gear pivotally supported for rotation; first arresting means rotating unitarily with said first gear to define a pair of rotational paths; a second gear pivotally supported for rotation while operatively engaging said first gear; a first and second lever pivotally attached to said second gear, said first lever rotating in a clock-wise direction and said second lever rotating in a counter clock-wise direction; second arresting means attached to said levers and adapted to be displaced into said rotational paths of said first arresting means upon said first lever rotating in said clock-wise direction and said second lever rotating in said counter clock-wise direction; and stop means adapted to be selectively engaged by said levers upon rotation of said second gear means causing said first and second levers to selectively position said second arresting means into one of said rotational paths of said first arresting means for preventing rotation of said first and second gears.

9. A gear train stop assembly comprising: first gear means pivotally supported about an axis of rotation; first arresting means rotating unitarily with said first gear means to define paths of rotation; second gear means pivotally supported about an axis of rotation while operatively engaging said first gear; a first and second lever pivotally attached to said second gear; second arresting means attached to each of said levers and adapted to be displaced into said paths of rotation of said first arresting means upon said second gear means rotating through a predetermined angle; and stop means adapted to be selectively engaged by said levers upon rotation of said second gear means causing said first lever to rotate in a first direction to displace said second arresting means into one of said paths of said first arresting means upon said second gear means rotating through said predetermined angle in a first direction for preventing rotation of said first and second gear means and said second lever to rotate in a second direction to position said second arresting means into one of said paths of said first arresting means upon said second gear means rotating through said predetermined angle in a second direction for preventing rotation of said first and second gear means.

References Cited in the file of this patent

UNITED STATES PATENTS

| | | |
|---|---|---|
| 1,173,423 | Hagelstien | Feb. 29, 1916 |
| 2,237,108 | Nichols | Apr. 1, 1941 |
| 2,464,584 | Kesselring | Mar. 15, 1949 |
| 2,477,670 | Toth et al. | Aug. 2, 1949 |
| 2,479,555 | Burbage | Aug. 23, 1949 |
| 2,766,638 | Vice | Oct. 16, 1956 |
| 2,806,486 | McDonald et al. | Sept. 17, 1957 |